United States Patent
Schorn et al.

(10) Patent No.: US 12,249,128 B2
(45) Date of Patent: Mar. 11, 2025

(54) METHOD, DEVICE, AND COMPUTER PROGRAM FOR AN UNCERTAINTY ASSESSMENT OF AN IMAGE CLASSIFICATION

(71) Applicant: Robert Bosch GmbH, Stuttgart (DE)

(72) Inventors: Christoph Schorn, Benningen Am Neckar (DE); Lydia Gauerhof, Sindelfingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 439 days.

(21) Appl. No.: 17/698,766

(22) Filed: Mar. 18, 2022

(65) Prior Publication Data
US 2022/0309771 A1 Sep. 29, 2022

(30) Foreign Application Priority Data
Mar. 23, 2021 (DE) ...................... 10 2021 202 813.6

(51) Int. Cl.
*G06V 10/776* (2022.01)
*G06N 3/04* (2023.01)
(Continued)

(52) U.S. Cl.
CPC ........... *G06V 10/776* (2022.01); *G06N 3/045* (2023.01); *G06V 10/26* (2022.01); *G06V 10/764* (2022.01); *G06V 10/774* (2022.01); *G06V 10/82* (2022.01)

(58) Field of Classification Search
USPC ........................................................ 382/157
See application file for complete search history.

(56) References Cited

U.S. PATENT DOCUMENTS 10,766,137 B1 * 9/2020 Porter ...................... G06N 3/04
10,997,421 B2 * 5/2021 Khosla .................. G06V 20/52
(Continued)

FOREIGN PATENT DOCUMENTS

CN 112115009 A * 12/2020 ............ G06F 11/261
CN 109298993 B * 7/2022 .......... G06F 11/3692
(Continued)

OTHER PUBLICATIONS

Gao, et al.: "HEp-2 Cell Image Classification With Deep Convolutional Neural Networks", IEEE Journal of Biomedical and Health Informatics, 21(2), 2017, pp. 416-428.
(Continued)

*Primary Examiner* — Allen H Nguyen
(74) *Attorney, Agent, or Firm* — NORTON ROSE FULBRIGHT US LLP; Gerard A. Messina (57) ABSTRACT

A method for ascertaining an uncertainty of a prediction of a first machine learning system. The method includes: processing a detected input variable by way of the first machine learning system, intermediate results, which are ascertained during the processing of the input variable by way of the machine learning system, being stored. Processing at least one of the stored intermediate results by way of a second machine learning system, the second machine learning system outputting an output variable, which characterizes an uncertainty of the output classification. A method for training the second machine learning system and a computer system, computer program, and a machine-readable memory element, on which the computer program is stored, are also described.

15 Claims, 4 Drawing Sheets

(51) Int. Cl.
   *G06N 3/045*  (2023.01)
   *G06V 10/26*  (2022.01)
   *G06V 10/764*  (2022.01)
   *G06V 10/774*  (2022.01)
   *G06V 10/82*  (2022.01)

(56) References Cited

U.S. PATENT DOCUMENTS

| | | | | |
|---|---|---|---|---|
| 2020/0410350 | A1* | 12/2020 | Yoon | G06F 18/2433 |
| 2021/0142160 | A1* | 5/2021 | Mohseni | H01L 22/34 |
| 2021/0329029 | A1* | 10/2021 | Vasseur | H04L 43/065 |
| 2022/0138510 | A1* | 5/2022 | Dai | G06F 18/24133 |
| | | | | 706/15 |

FOREIGN PATENT DOCUMENTS

| | | | | |
|---|---|---|---|---|
| CN | 115374898 | A | * 11/2022 | |
| DE | 102017217733 | A1 | 4/2019 | |
| DE | 102018207220 | A1 | 11/2019 | |
| JP | 7429715 | B2 | * 2/2024 | G06V 10/25 |

OTHER PUBLICATIONS

Gauerhof, et al.: "Considering Reliability of Deep Learning Function to Boost Data Suitability and Anomaly Detection", 2020 IEEE International Symposium on Software Reliability Engineering Workshops (ISSREW). IEEE, (2020), pp. 249-254.

Schorn and Gauerhof: "Facer: a Universal Framework for Detecting Anomalous Operation of Deep Neural Networks", 2020 IEEE 23rd International Conference on Intelligent Transportation Systems (ITSC), IEEE, (2020). pp. 1-6.

International Standard ISO 26262-1. Road vehicles—Functional safety—Part 1: Vocabulary, IS 26262-1:2018(E), ISO (2018), pp. 1-42.

Laksminarayanan etal., "Simple and Scalable Predictive Uncertainty Estimation Using Deep Ensembles," 31st Conference on Neural Information Processing Systems (NIPS'17), Long Beach, CA, USA, 2017, pp. 1-12. <https://proceedings.neurips.cc/paper/2017/file/9ef2ed4b7fd2c810847ffa5fa85bce38-Paper.pdf> Downloaded Mar. 18, 2021.

Mukhoti et al., "Evaluating Bayesian Deep Learning Methods for Semantic Segmentation," Cornell University, 2019, pp. 1-13. <https://arxiv.org/pdf/1811.12709.pdf> Downloaded Mar. 18, 2021.

ISO/PAS 21448 Road Vehicles—Safety of the Intended Functionality, 2019, pp. 1-64.

* cited by examiner

METHOD, DEVICE, AND COMPUTER PROGRAM FOR AN UNCERTAINTY ASSESSMENT OF AN IMAGE CLASSIFICATION

CROSS REFERENCE

The present application claims the benefit under 35 U.S.C. § 119 of German Patent Application No. DE 10 2021 202 813.6 filed on Mar. 23, 2021, which is expressly incorporated herein by reference in its entirety.

FIELD

The present invention relates to a method for assessing a prediction of a first machine learning system with respect to an uncertainty of this prediction with the aid of a second machine learning system. The present invention also relates to a device and a computer program which are each configured to carry out the method.

BACKGROUND INFORMATION

Neural networks for classifying, for example, image data typically apply the softmax function to the final output layer, so that the output values may be interpreted as predicted class probabilities. However, it has been shown that these softmax outputs are not well calibrated, in the sense that they do not represent how reliable a neural network is over its classification. For example, a network could always output a softmax value of >95% when it predicts an input of a class "A," but nonetheless incorrectly classify a great deal more than 5% of these inputs.

To address this "overconfidence effect" of neural networks, multiple methods for estimating the uncertainty have been introduced:

In the method, "Deep Ensembles" (Balaji Lakshminarayanan, Alexander Pritzel, and Charles Blundell. 2017. Simple and scalable predictive uncertainty estimation using deep ensembles. In Proceedings of the 31st International Conference on Neural Information Processing Systems (NIPS'17). Curran Associates Inc., Red Hook, NY, USA, 6405-6416), multiple instances of the same network architecture are trained on a data set, while the weights of each network are initialized randomly prior to the training. These networks are then used in parallel to draw conclusions and the uncertainty of a prediction is estimated based on the distribution of the individual network predictions.

The method "Monte Carlo Dropout" (Mukhoti, J. and Gal, Y., "Evaluating Bayesian Deep Learning Methods for Semantic Segmentation," arXiv e-prints, 2018) uses neural network architectures including dropout layers. These dropout layers set a predefined portion of randomly selected neurons in the particular layer to zero. The entropy and/or mutual pieces of information of the network outputs from multiple executions using random dropout masks are then used as an estimation for the uncertainty.

German Patent Application No. DE 10 2018 207 220 describes a method for detecting a calculation error or a malfunction of a processing unit or a memory during the operation of a neural network to be supervised on the processing unit with the aid of a further neural network. The further neural network receives intermediate results of the neural network to be supervised and ascertains as a function of its intermediate results whether a calculation error or a malfunction has occurred during the operation of the neural network to be supervised.

SUMMARY

An accurate estimation of the uncertainty is required in particular if the output of the neural network is the foundation for safety-critical decisions, for example, in an automated vehicle. Existing uncertainty methods, for example, Bayesian neural networks or deep ensembles, require a high computing power (multiple executions of the DNN(s)). In addition, the prediction of the uncertainty is not trained separately, but rather jointly with the main task of the neural networks, which reduces the flexibility and may influence the performance of the network in the main task. Independently of the main task, there is no approach for optimizing the uncertainty measure. Moreover, there is no approach to decompose the DNN and the uncertainty method. A decomposition strategy may be necessary to achieve a certain measure of vehicle safety (ASIL, see also ISO26262, PAS ISO 21448).

One object of the present invention is to ascertain the uncertainty of an output of a neural network in an automated manner and with low computing time in real time.

The present invention may achieve this object in that a small machine learning system, in particular a smaller neural network, is provided which supervises a first machine learning system. The small machine learning system is capable during the operation of the first machine learning system of ascertaining as a function of intermediate results of the first machine learning system how reliable the prediction of the first machine learning system is.

Multiple advantages result therefrom:

The small machine learning system requires significantly less processing power than other uncertainty methods. In addition, it is suitable to be calculated using the arithmetic in dedicated neural network accelerators, because calculations may be carried out in a data format suitable for a low bit width.

The small machine learning system may be trained on a different data set than the first machine learning system itself is trained.

The training of the small machine learning system is fast due to the independence from the training of the second machine learning system and due to its small size.

The first machine learning system may be expanded with respect to uncertainty predictions without modification, i.e., its input-output relation remains the same before and after adding the uncertainty prediction. This is desirable to decompose the development and checking of task DNN and supervision DNN (for example, ASIL decomposition in the automobile domain).

In a first aspect of the present invention, a computer-implemented method for ascertaining an uncertainty of a prediction of a first machine learning system, which is an image classifier, is provided. An uncertainty may be understood as a measure which indicates to what extent the output of the first machine learning system is reliable, that the determined class is actually present in the input variable of the first machine learning system. It may thus be understood as a measure of a reliability, in particular an expected accuracy, of the classification.

In accordance with an example embodiment of the present invention, the method includes at least the following steps: First, processing of a detected input variable by the first machine learning system and in particular outputting a classification of the input variable are carried out. The detected input variable may be detected, for example, by a sensor. The sensor may be any arbitrary imaging sensor, preferably a camera, LIDAR, or radar.

During the processing of the input variable by the first machine learning system, intermediate results are stored. These stored intermediate results are then processed by a second machine learning system. The second machine learning system outputs an output variable which characterizes an uncertainty of the output classification of the first machine learning system, the second machine learning system having been trained in such a way that it outputs an uncertainty of the classification of the first machine learning system as a function of the at least one intermediate result.

It is provided that the first and the second machine learning systems are each a neural network, an architecture of the neural network of the second machine learning system being smaller than the architecture of the neural network of the first machine learning system. An architecture may be understood as a structure, in particular a number of neurons and/or layers, of the neural network.

It is to be noted that the two machine learning systems may also be other models of machine learning, for example, classical/statistical learning systems.

Furthermore, it is provided that when the second machine learning system outputs an uncertainty greater than a predefined threshold value, a warning is output. A threshold value may be defined as a function of the application, which establishes a minimum probabilistic certainty of the classification. For example, this threshold value may be higher for safety-critical applications than for applications in which classifications of the first machine learning system are released by a user.

It is possible that a control variable for a technical system is ascertained as a function of the classification of the first machine learning system. The control variable may be used to control an actuator of a technical system. The technical system may be, for example, an at least semi-autonomous vehicle, a robot, a tool, a machine tool, or a flying object, such as a drone. If the uncertainty of the second machine learning system is greater than the predefined threshold value, the ascertainment of the control variable may be suspended and/or may be confirmed to a user by the warning.

Furthermore, it is provided that the second machine learning system, during the processing of the intermediate results, receives compressed intermediate results as input variables, which are compressed intermediate results of the first machine learning system. The compression may be achieved, for example, by a summation over a plurality of elements of the particular intermediate variable or by a principal component analysis (PCA). To keep the information loss low upon the compression, preferably partial sums are ascertained over individual sections of the intermediate results of the first machine learning system as the compressed intermediate results.

In a further aspect of the present invention, a computer-implemented method for training the second machine learning system is provided. In accordance with an example embodiment of the present invention, the method includes at least the following steps:

Providing a set of training data, the set of training data containing training input data which are ascertained intermediate results of the first machine learning system and particular associated labels which characterize an uncertainty. The uncertainty relates to the classification of the first machine learning system ascertained as a function of the particular intermediate variable. This is followed by training the second machine learning system in such a way that, as a function of intermediate results, it ascertains their associated labels.

It is provided that the labels correspond to an expected accuracy of the classification of the first machine learning system.

The expected accuracy may be ascertained with the aid of a reference uncertainty estimation method. A reference uncertainty estimation method may be based on a deep ensemble of the first machine learning system being used to ascertain the expected accuracy over the ensemble therefrom. It is also possible that a Bayesian neural network is used as the reference, whose output uncertainty is used as the label. It is also possible that the above-mentioned dropout is applied in the first machine learning system and the expected accuracy is determined as a function of a distribution of the classifications of the machine learning system. It is also possible that the expected accuracy is ascertained on the basis of an entropy assessment of the classification.

Furthermore, it is provided that the expected accuracy is ascertained as a function of a plurality of augmented input variables of the first machine learning system and a calculation of a portion of incorrect classifications of the first machine learning system as a function of the augmented input variables. Multiple versions of the input are created by augmentation techniques, such as random rotation/distortion or mirrors. The first machine learning system is thereupon used to ascertain a classification of each input. The uncertainty may thereupon be ascertained on the basis of the distribution of the classifications.

Furthermore, it is provided that the first machine learning system outputs a semantic segmentation, the expected accuracy as a function of a mean classification error rate in various regions of this segmentation map being used as the uncertainty measure. This is particularly suitable for the segmenting tasks in which the classification errors may be calculated in various areas of the input. It is also possible that the mean classification error rate and the augmentation of the input variables are combined to ascertain the expected accuracy.

Furthermore, it is provided that the training is carried out as a binary classification problem (uncertain versus determined) or as a regression task (scalar uncertainty value between 0 and 1). If a binary classification is trained, a binary cross entropy loss may be used, and the loss may be, for example, the mean square error for the regression. Standard backpropagation techniques may be used for optimization.

In a further aspect, a computer program is provided. The computer program is configured to carry out one of the above-mentioned methods. The computer program includes instructions which prompt a computer to carry out one of these mentioned methods including all of its steps when the computer program runs on the computer. Furthermore, a machine-readable memory module is provided, on which the computer program is stored. Moreover, a device is provided which is configured to carry out one of the methods.

Exemplary embodiments of the above-mentioned aspects are shown in the figures and explained in greater detail in the following description.

DETAILED DESCRIPTION OF EXAMPLE EMBODIMENTS

Figure 1:
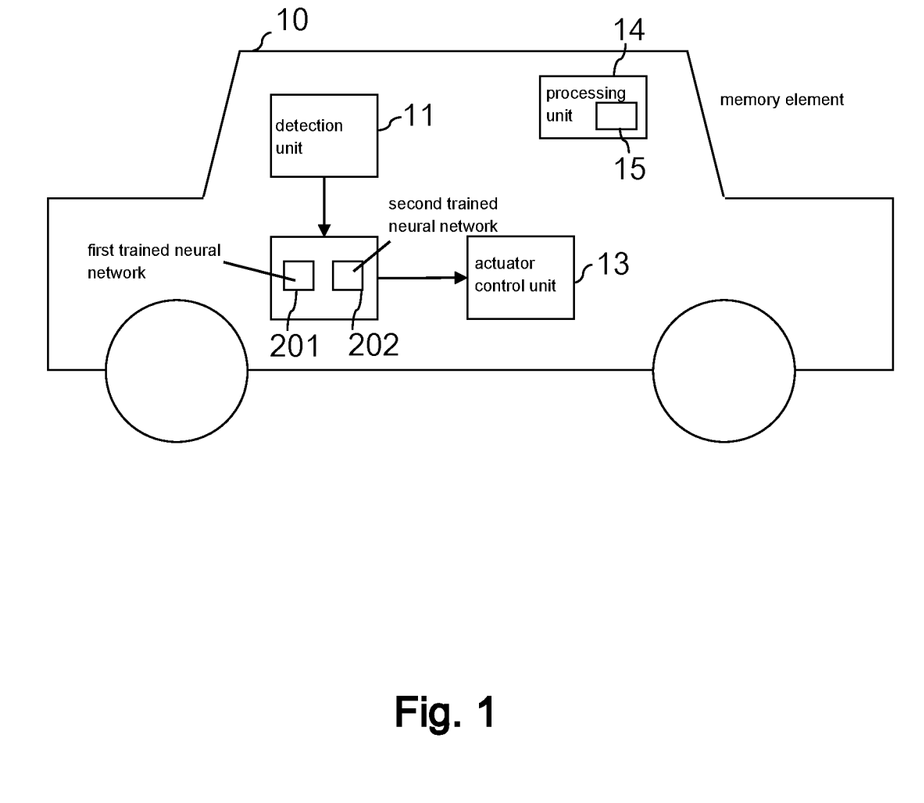
FIG. 1 shows a schematic representation of an at least semi-autonomous vehicle, in accordance with an example embodiment of the present invention.

FIG. 1 shows a schematic representation of an at least semi-autonomous vehicle 10. In another exemplary embodiment, at least semi-autonomous vehicle 10 may be a service robot, assembly robot, or stationary production robot, alternatively an autonomous flying object, such as a drone. At least semi-autonomous vehicle 10 may include a detection unit 11. Detection unit 11 may be, for example, a camera, which detects surroundings of vehicle 10. Other types of sensors such as radar or LIDAR are also possible. Detection unit 11 may be connected to a machine learning system, preferably a first trained neural network 201. First trained neural network 201 ascertains an output variable as a function of a provided input variable, for example, provided by detection unit 11, and as a function of a plurality of parameters of first trained neural network 201. The output variable may be transferred to an actuator control unit 13. Actuator control unit 13 controls an actuator as a function of the output variable of first trained neural network 201. In this exemplary embodiment, the actuator may be a motor of vehicle 10.

First trained neural network 201 is supervised with the aid of a second machine learning system, preferably a second trained neural network 202, and outputs the uncertainty of a statement of first neural network 201. A high uncertainty may optionally be taken into consideration by actuator control unit 13 and the actuator may be activated accordingly.

Furthermore, vehicle 10 includes a processing unit 14 and a machine-readable memory element 15. A computer program may be stored on memory element 15, which includes commands which, upon the execution of the commands on processing unit 14, have the result that processing unit 14 carries out the method according to the present invention. It is also possible that a download product or an artificially generated signal, which may each include the computer program, prompt processing unit 14 to carry out the method according to the present invention after being received on a receiver of vehicle 10.

In another exemplary embodiment, actuator control unit 13 includes a release system. The release system decides whether an object, for example, a detected robot or a detected person, has access to an area, as a function of the output variable of first trained neural network 201. The actuator may preferably be activated as a function of a decision of the release system.

In an alternative exemplary embodiment, vehicle 10 may be a tool or a machine tool. A material of a workpiece may be classified with the aid of first trained neural network. The actuator in this case may be, for example, a motor which drives a grinding head.

In another specific embodiment, first trained neural network 201 is used in a measuring system (not shown in the figures). The measuring system differs from vehicle 10 according to FIG. 1 in that the measuring system does not include an actuator control unit 13. The measuring system may store or display the output variable of first trained neural network 201, for example, with the aid of visual or auditory representations, instead of transferring it to actuator control unit 13.

It is also possible that in one refinement of the measuring system, detection unit 11 detects an image of a human or animal body or a part thereof. For example, this may be carried out with the aid of an optical signal, with the aid of an ultrasound signal, or with the aid of an MRT/CT method. The measuring system in this refinement may include first trained neural network 201, which is trained so as to output a classification as a function of the input variable, for example, of which clinical picture possibly exists on the basis of this input variable. Second trained neural network 202 supervises first trained neural network 201 in this case.

Figure 2:
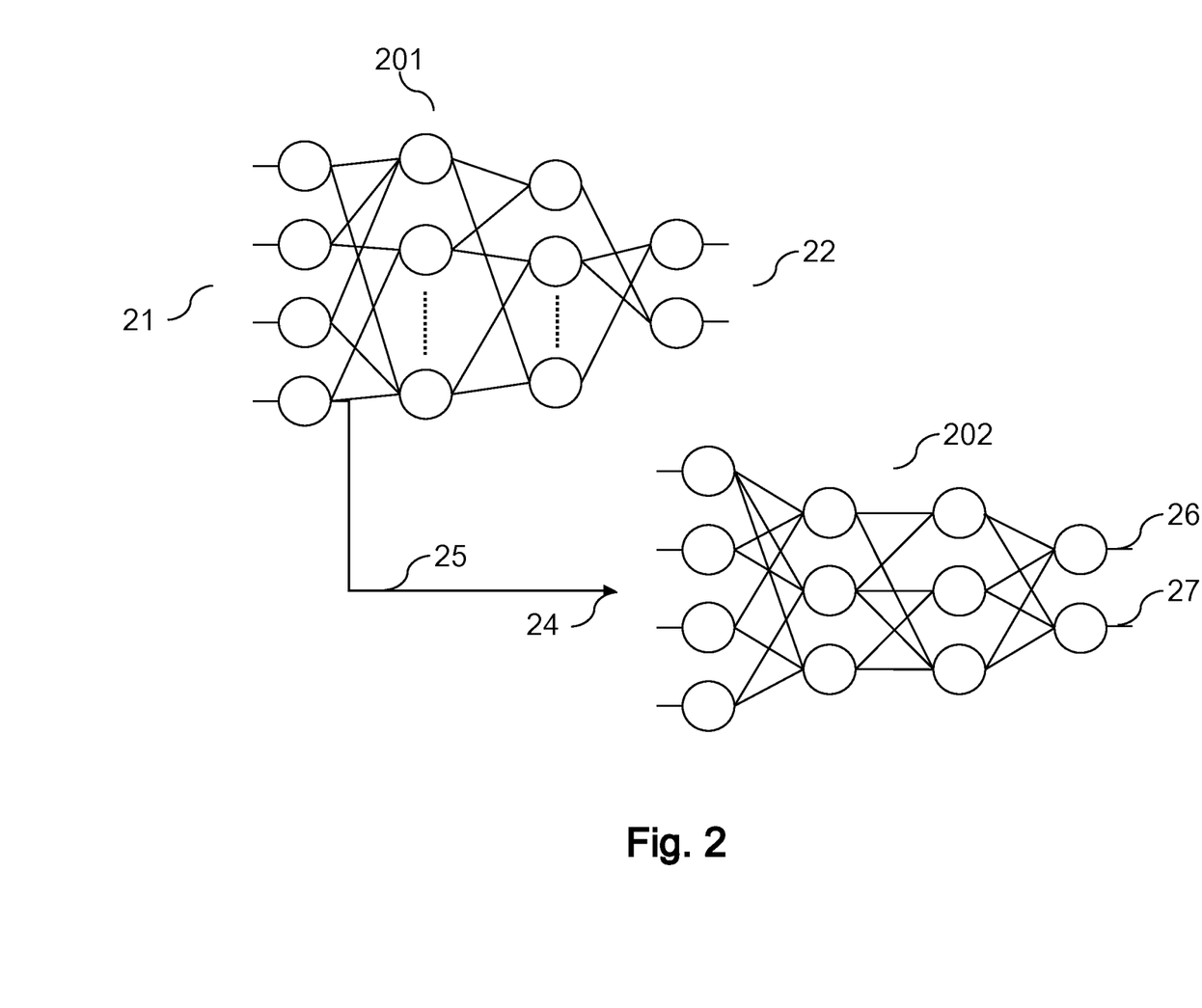
FIG. 2 shows a schematic representation of a first and a second neural network, in accordance with an example embodiment of the present invention.

The two trained neural networks 201, 202 and their interconnection are schematically shown in FIG. 2.

First trained neural network 201 includes a plurality of layers each including multiple neurons, which are connected to neurons of preceding and following layers. The first layer of first trained neural network 201 receives an input variable 21, which is processed in a first layer of first trained neural network 201. The result of the first layer is transferred to the following layer, which receives this result as the input variable and ascertains an output variable as a function of this result. The output variable is subsequently transferred to the following layer. This described processing (propagation) in layers of the input variable along first trained neural network 201 is carried out until a last layer of first trained neural network 201 has ascertained its output variable 22. The activation functions of the last layer of first trained neural network 201 are preferably softmax functions.

Second trained neural network 202 receives at least one output variable of at least one of the layers of first trained neural network 201 as an input variable 24 and subsequently ascertains an output variable 26 as a function of this input variable 24. This output variable 26 characterizes an uncertainty of output variable 22.

Input variable 24 of second trained neural network 202 may be provided, for example, with the aid of at least one connection 25 to the second trained neural network 202.

In one preferred exemplary embodiment, second neural network 202 may output a plurality of output variables 26, 27, which may be associated, for example, with different classifications of first neural network 201. When the first neural network outputs a semantic segmentation, for example, different regions of a segmentation map may each be associated with an output variable 26, 27 of second neural network.

In another exemplary embodiment, at least one output variable of one of the layers of first trained neural network 201 may include a higher-dimensional vector, whose individual elements are provided summed as a compressed intermediate result as input variable 24 of second trained neural network 202. It is possible to use similar information compression methods so that input variable 24 of second trained neural network 202 is more compact.

Input variable 24 of second neural network 202 is at least one intermediate result, also called an intermediate variable hereinafter, of first neural network 201. However, it is also possible that this input variable 24 includes up to all intermediate results. These may then be combined, for example, to form a tensor. It is to be noted that the input of second neural network 202 is then also to be designed in accordance with the dimensions of this tensor.

If first neural network 201 has a (2D) convolution layer, which is typically used in the image classification, the layer output is made up of multiple (2D) intermediate result maps (feature maps), which correspond to the various filter cores of the layer. These intermediate result maps may be added directly to input variable 24.

In one preferred specific embodiment, in addition to each intermediate result map, a single value is added by summation over all values of the particular intermediate result map. In addition to the sum pooling over intermediate results, other standard techniques for dimensionality reduction may also be applied, for example, a principal component analysis (PCA).

Figure 3:
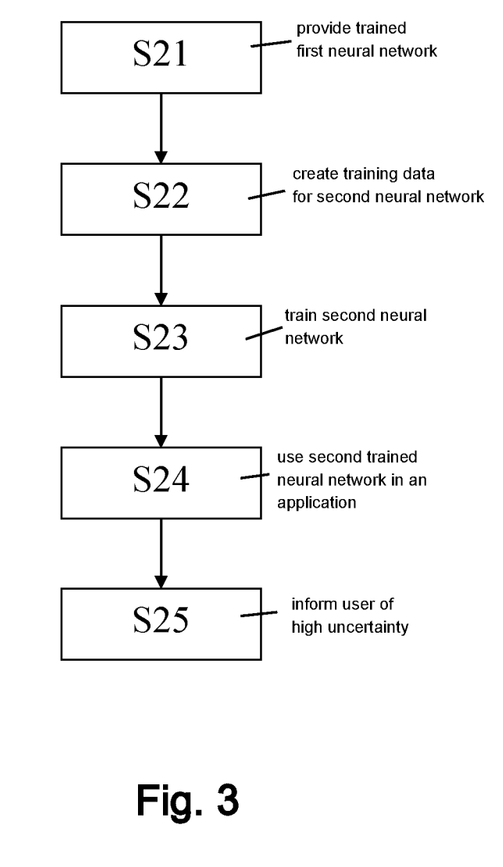
FIG. 3 shows a schematic representation of a specific embodiment of a method for ascertaining an uncertainty, in accordance with an example embodiment of the present invention.

FIG. 3 shows a schematic representation of a method for ascertaining an uncertainty.

The method may begin with step S21. In this step, trained first neural network 201 is provided. Alternatively, first neural network 201 may be trained in this step.

After step S21 is completed, step S22 follows. Herein, training data are created for training second neural network 202.

For this purpose, first neural network 201 may be applied to a plurality of input variables. The ascertained intermediate variables are each stored and added as training input variables to the training data for the second neural network. Furthermore, a label is associated with each intermediate variable. The label characterizes the uncertainty of the classification of the first neural network.

This uncertainty or label may be determined as follows:

It is possible that the uncertainty is ascertained with the aid of a reference uncertainty method. Preferably, for this purpose the first neural network is expanded by a dropout layer or an ensemble of differently initialized neural networks 201 is used. As a function of their ascertained classifications, an entropy-based uncertainty measure may be calculated.

Alternatively, the uncertainty may be ascertained in such a way that an incorrect classification rate of first neural network 201 is ascertained for a plurality of augmented input variables. The augmented input variables are generated by augmentation techniques, such as random translations or mirrors. First neural network 201 is then used to ascertain a classification of each input, the uncertainty being ascertained on the basis of the distribution of the classifications.

When step S22 has been completed, in following step S23, second neural network 202 is trained based on the training data from step S22.

It is to be noted that the second neural network may be trained in such a way that it outputs a binary classification, thus outputs either the class "uncertain" or "certain."

Alternatively, the second neural network may be trained in such a way that it outputs a continuous value which characterizes the uncertainty. The second neural network may carry out a regression, for example, and output a value between 0 and 1, for example, 1 characterizing a high uncertainty.

After second neural network 202 has been trained, it may be used in an application in step S24, for example, in vehicle 10.

When an uncertainty is ascertained upon use of second neural network 202 which is higher than a predefined threshold value, step S25 may be executed. In this step, a user may be informed about the high uncertainty via a warning tone.

Figure 4:
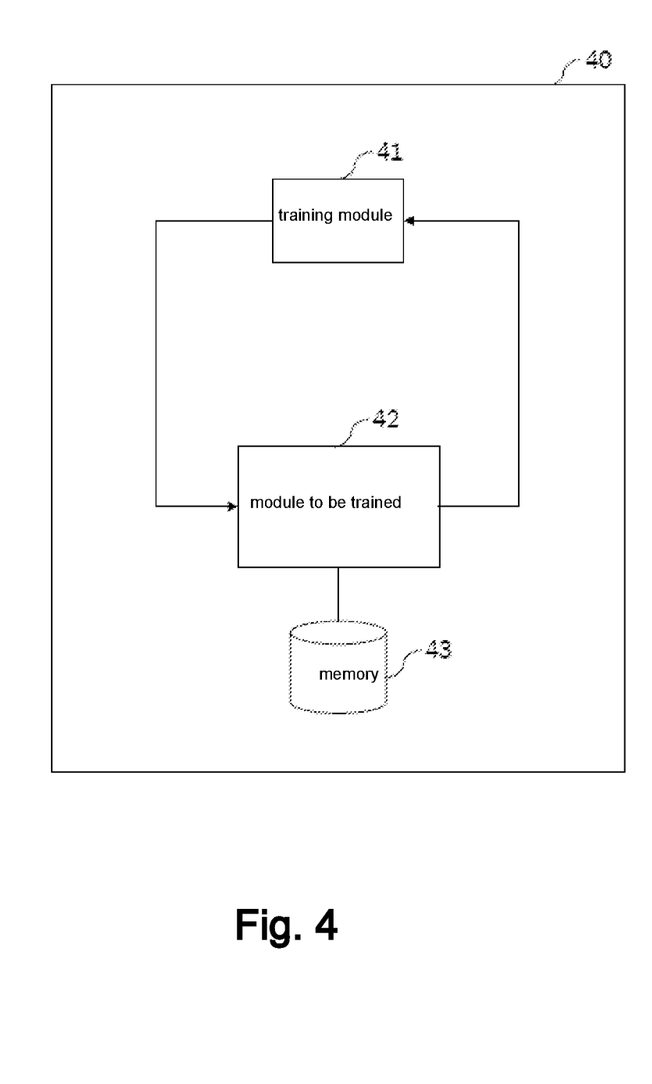
FIG. 4 shows a schematic representation of a specific embodiment of a device for training the first and second neural networks, in accordance with an example embodiment of the present invention.

FIG. 4 shows a schematic representation of a device 40 for training neural networks 201, 202, in particular for executing steps S21 and/or S23. Device 40 includes a training module 41 and a module 42 to be trained. This module 42 to be trained contains the two neural networks according to FIG. 2. Device 40 for training neural networks 201, 202 trains neural networks 201, 202 as a function of output variables of neural networks 201, 202 and preferably using predefinable training data. During the training, parameters of the two machine learning systems 201, 202 which are stored in a memory 43 are adapted.

What is claimed is:

1. A method for ascertaining an uncertainty of a classification, which is output by a first machine learning system, the method comprising the following steps:
    processing a detected input variable using the first machine learning system and outputting the classification;
    processing, using a second machine learning system, at least one intermediate result of a plurality of intermediate results, which are ascertained during the processing of the input variable by the first machine learning system; and
    outputting, by the second machine learning system, an output variable, which characterizes an uncertainty of the classification of the first machine learning system, as a function of the at least one intermediate result;
    controlling, based on the output classification, an actuator of a technical system, wherein the controlling of the actuator takes into consideration the output variable from the second machine learning system;
    wherein the second machine learning system has been trained in such a way that it outputs an uncertainty of the classification of the first machine learning system as a function of the at least one intermediate result.

2. The method as recited in claim 1, wherein each of the first and second machine learning systems is a neural network, an architecture of the neural network of the second machine learning system being smaller than an architecture of the neural network of the first machine learning system.

3. The method as recited in claim 1, wherein when the second machine learning system outputs an uncertainty greater than a predefined threshold value, a warning is output.

4. The method as recited in claim 1, wherein the detected wherein the detected input variable is detected by a sensor of the technical system, the sensor including an imaging sensor.

5. The method as recited in claim 4, wherein the actuator is a motor.

6. The method as recited in claim 5, wherein the technical system is an at least semi-autonomous vehicle.

7. The method as recited in claim 5, wherein the technical system is a robot or a tool.

8. The method as recited in 1, further comprising:
    ascertaining a control variable as a function of the output classification;
    controlling the actuator of the technical system based on the ascertained control variable, and taking into consideration the output variable from the second machine learning system.

9. A method for training a second machine learning system, comprising the following steps:
    providing a set of training data, the set of training data containing a plurality of training input data, which are ascertained intermediate results of a first machine learning system and labels associated with each of the training input data, which characterize an uncertainty, training the second machine learning system in such a way that it, as a function of the intermediate results, ascertains their associated labels;

after the training, providing the trained second machine learning system to a vehicle;

processing a detected input variable using the first machine learning system and outputting by the first machine learning system a classification;

processing, using the trained second machine learning system, at least one intermediate result of a plurality of intermediate results, which are ascertained during the processing of the input variable by the first machine learning system;

outputting, by the second machine learning system, an output variable, which characterizes an uncertainty of the classification of the first machine learning system, as a function of the at least one intermediate result; and controlling, based on the output classification, an actuator of the vehicle, wherein the controlling of the actuator takes into consideration the output variable from the second machine learning system.

10. The method as recited in claim 9, wherein the labels correspond to an expected accuracy of a classification of the first machine learning system.

11. The method as recited in claim 10, wherein the expected accuracy is ascertained using a reference uncertainty estimation method.

12. The method as recited in claim 10, wherein the expected accuracy is ascertained as a function of a plurality of augmented input variables of the first machine learning system and a calculation of a portion of incorrect classifications of the first machine learning system as a function of the augmented input variables.

13. The method as recited in claim 10, wherein the classification of the first machine learning system is a semantic segmentation, the expected accuracy being a function of a mean classification error rate in various regions of the semantic segmentation.

14. A non-transitory machine-readable memory element on which is stored a computer program for ascertaining an uncertainty of a classification, which is output by a first machine learning system, the computer program, when executed by a computer, causing the computer to perform the following steps:

processing a detected input variable using the first machine learning system and outputting the classification;

processing, using a second machine learning system, at least one intermediate result of a plurality of intermediate results, which are ascertained during the processing of the input variable by the first machine learning system; and outputting, by the second machine learning system, an output variable, which characterizes an uncertainty of the classification of the first machine learning system, as a function of the at least one intermediate result;

controlling, based on the output classification, an actuator of a technical system, wherein the controlling of the actuator takes into consideration the output variable from the second machine learning system;

wherein the second machine learning system has been trained in such a way that it outputs an uncertainty of the classification of the first machine learning system as a function of the at least one intermediate result.

15. A device configured to ascertain an uncertainty of a classification, which is output by a first machine learning system, the device configured to:

process a detected input variable using the first machine learning system and outputting the classification;

process, using a second machine learning system, at least one intermediate result of a plurality of intermediate results, which are ascertained during the processing of the input variable by the first machine learning system; and output, by the second machine learning system, an output variable, which characterizes an uncertainty of the classification of the first machine learning system, as a function of the at least one intermediate result;

control, based on the output classification, an actuator of a technical system, wherein the controlling of the actuator takes into consideration the output variable from the second machine learning system;

wherein the second machine learning system has been trained in such a way that it outputs an uncertainty of the classification of the first machine learning system as a function of the at least one intermediate result.

* * * * *